INVENTOR.
LEONARD J. BAUN
BY
Eugene M. Whitacre
Attorney

INVENTOR.
LEONARD J. BAUN
BY
Eugene M. Whitacre
Attorney 3,420,952

NON-RANDOM FIELD SHIFT APPARATUS FOR A TELEVISION WAVEFORM MONITOR

Leonard J. Baun, Cinnaminson, N.J., assignor to Radio Corporation of America, a corporation of Delaware Filed Mar. 22, 1965, Ser. No. 441,779
U.S. Cl. 178—69.5 8 Claims
Int. Cl. H04l *7/00;* G01r *25/00;* H03k *3/00*

ABSTRACT OF THE DISCLOSURE

Non-random field shift apparatus for a television waveform monitor including a bistable multivibrator which is switched in a given sequence by triggers supplied at the vertical synchronizing rate (VSR). Manual insertion of a "shift" pulse switches the multivibrator from the state it is in at that time to its complementary state. Subsequently supplied VSR triggers then switch the multivibrator in a reverse sequence. Those triggers generated from the multivibrator output prior to the reversal coincide with the start of one television field while those generated afterwards coincide with the start of the alternate interlaced field. These latter triggers are used to shift the time-base system of the waveform monitor.

Figure 1:
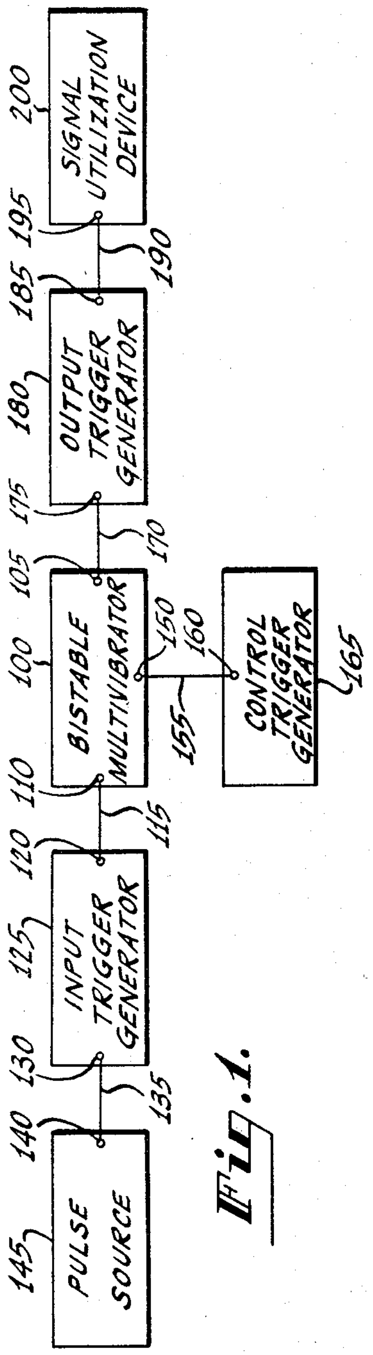

This invention relates to the control of a waveform monitor and particularly to the control of the time base system of such a monitor.

Included in the behind-the-scenes activities in a television broadcast studio is the monitoring, in the control room, of signal waveforms. One aspect of this monitoring concerns the investigation of that portion of the video signal to be transmitted known as the synchronizing portion. It is this portion and, more particularly, it is the information included in this portion, that, when recovered at the television receiver, will synchronize, or lock, the deflection system of the receiver to that of the television camera. This investigation is usually carried out on a television waveform monitor.

It would be desirable if the person monitoring the synchronizing information could have at his disposal some means for selectively viewing the signal waves occurring during alternate vertical blanking intervals of the video signal associated with the two television fields that together make up each frame of picture information. Such viewing would permit a complete analysis to be made of the horizontal synchronizing pulses, the vertical synchronizing pulses and the equalizing pulses that occur during each blanking interval. This analysis would, therefore, permit a check to be made of the interlacing action within the television camera and of the operation of the synchronizing generator, for example. Any distortion that might be introduced in the reproduced television picture because of imprecisely operating studio equipment of this type can, in this way, be predetermined and the equipment adjusted to compensate for it, if necessary.

Various arrangements have been developed to permit such alternate viewing. Commonly called field shift arrangements, each, by and large, includes a manually operated device which, when actuated, electronically switches the time base system of the waveform monitor from the field associated with the vertical blanking interval then being viewed to the alternate field. As presently constructed, however, most of these arrangements operate randomly. Just as often as the alternate blanking interval will be displayed, so too will the initial blanking interval be displayed. Since neither blanking interval will most probably contain any outstanding characteristic that will immediately distinguish it from the other, the only way to tell that a shift has occurred is to remember what the monitor display looked like before the manual device was actuated and then compare it with what the display looks like afterwards. Such a task can be a chore in and of itself.

It is an object of the present invention, therefore, to provide non-random field shift apparatus for a television waveform monitor. As will become clear hereinafter, such apparatus overcomes the disadvantages and limitations of the prior art field shift arrangements.

In accordance with the invention, non-random field shift apparatus for a television waveform monitor includes a bistable multivibrator. The apparatus also includes first means for supplying a periodic train of vertical synchronizing pulses to the multivibrator to effectuate switching thereof in a given sequence, the odd-numbered pulses of the train being time coincident with the start of one of the two interlaced fields of television picture information generated within a television camera and the even-numbered pulses of the train being time coincident with the start of the other of the interlaced fields. The apparatus additionally includes second means for supplying a control trigger pulse to the multivibrator to reverse the switching sequence effectuated therein by the periodic train of synchronizing pulses. The apparatus further includes means for coupling the output signal developed by the multivibrator to the sweep deflection circuits of the television waveform monitor to shift the time base system of the waveform monitor from that corresponding to one interlaced field to that corresponding to the alternate interlaced field in response to the switching sequence reversal of the multivibrator.

Figure 2:
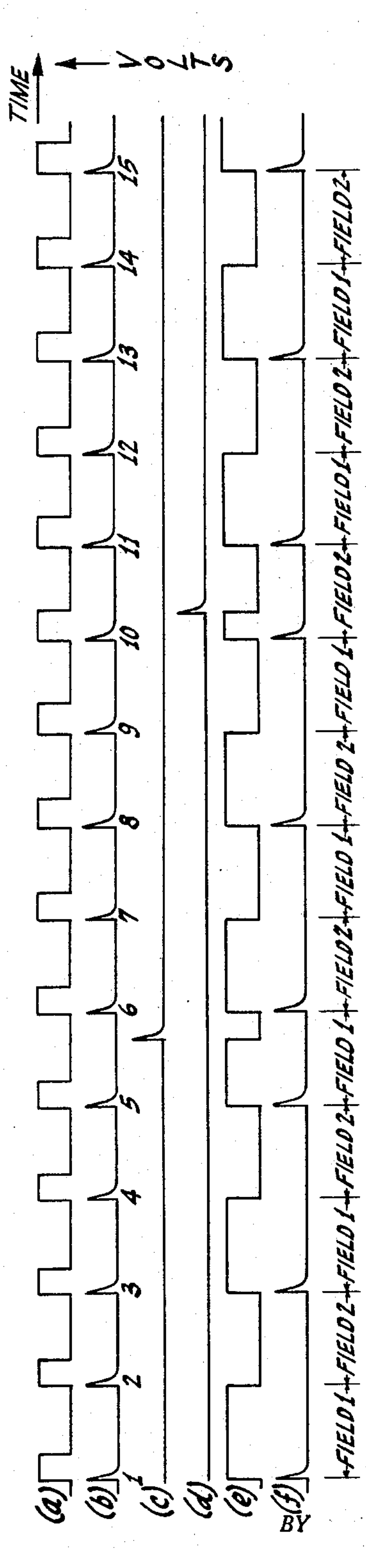
Figure 3:
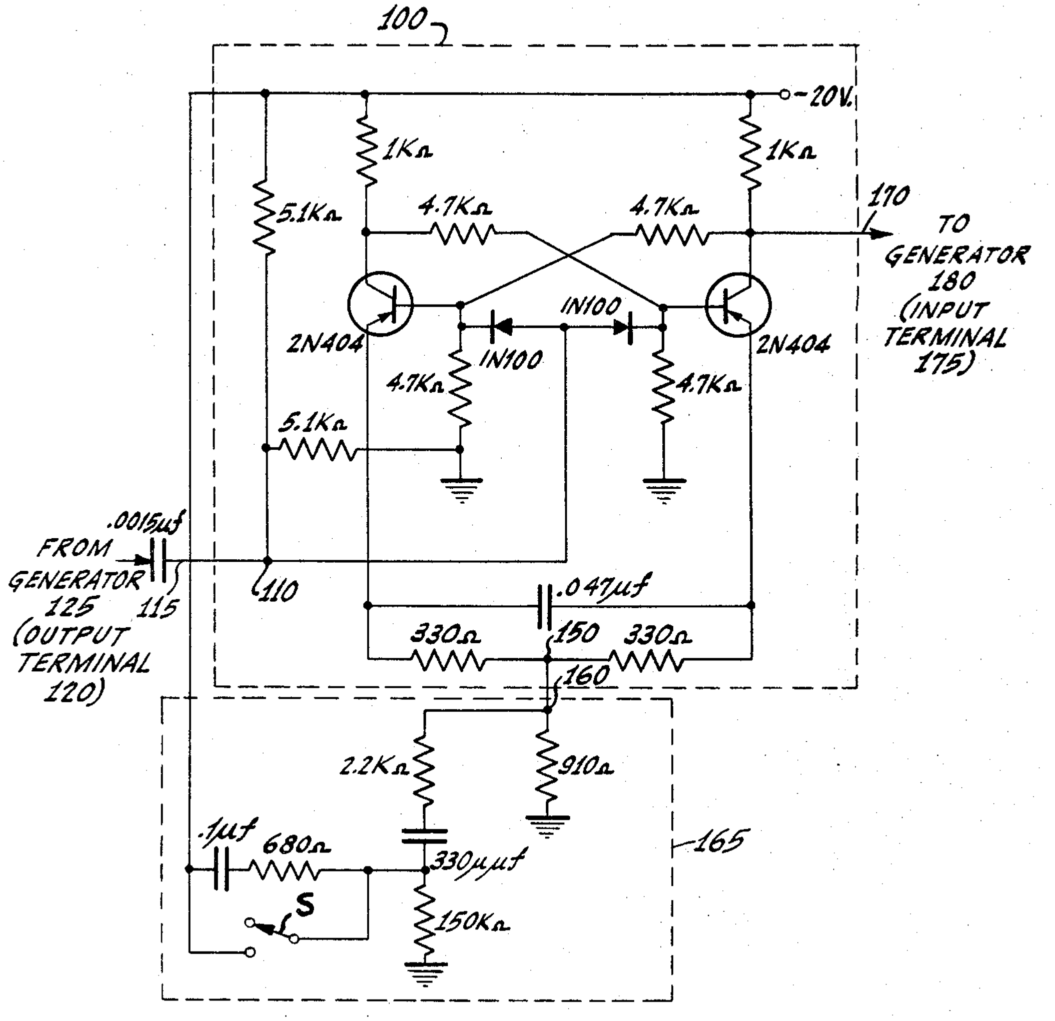

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a block diagram of a non-random field shift apparatus for a television waveform monitor in accordance with the principles of the present invention;

FIGURES 2(*a*)-2(*f*) is a graphic representation of signal waveforms helpful in understanding the operation of the invention; and FIGURE 3 is a schematic diagram of a portion of the non-random field shift apparatus of FIGURE 1.

Referring to the drawings and, more particularly to FIGURE 1, there is shown a block diagram of a non-random field shift apparatus for a television waveform monitor. In FIGURE 1, a bistable multivibrator 100 having two complementary stable states is provided. These stable states are represented by a "1" and a "0." When the multivibrator is in its "1" state, the more positive of two different voltage levels is developed at its output terminal 105. When the multivibrator is in its "0" state, the more negative of the two voltage levels is developed at its output terminal. Multivibrator 100 may be of conventional construction.

Connected to the input terminal 110 of the multivibrator 100—via an electrical conductor 115—is the output terminal 120 of an input trigger generator 125. Trigger generator 125 is of the type that develops an output trigger for every input pulse supplied to it and may be of conventional construction. As shown in FIGURE 1, generator 125 has its input terminal 130 connected—via an electrical conductor 135—to the output terminal 140 of a pulse source 145. Pulse source 145 is intended to represent the vertical scanning oscillator of the waveform monitor and therefore supplies a vertical synchronizing pulse every 1/60 of a second. As such, pulse source 145 and trigger generator 125 together comprise a means for supplying a periodic train of vertical synchronizing pulses to the multivibrator 100 to cause it to sequentially switch between its "1" and "0" states.

Connected to the control terminal 150 of the multivibrator 100—via an electrical conductor 155—is the output terminal 160 of a control trigger generator 165. Trigger generator 165 is of the type that is manually actuated to develop a single trigger for each actuation and may also be of conventional construction. Generator 165, in conjunction with a pushbutton or other manual actuating device (not shown, but understood as being included within generator 165) comprises a means for supplying a triggering pulse to the multivibrator to switch it from the stable state it is in at that time to its complemtanary stable state. Vertical synchronizing pulses supplied thereafter by pulse source 145 and trigger generator 125 to the multivibrator are then effective to switch it in a reverse sequence to that caused by previously supplied synchronizing pulses. This will be more fully described below.

Connected to the output terminal 105 of the multivibrator 100—via an electrical conductor 170—is the input terminal 175 of an output trigger generator 180. Trigger generator 180 is also of the type that develops an output trigger for every input pulse supplied to it, and may of conventional construction. As shown in FIGURE 1, generator 180 has its output terminal 185 connected—via an electrical conductor 190—to the input terminal 195 of a signal utilization device 200, intended to represent the sweep deflection circuits of the waveform monitor. Trigger generator 180, therefore, comprises a means for coupling the output signal developed by the multivibrator to the sweep deflection circuits of the television waveform monitor to shift the time base system of the monitor from that corresponding to the interlaced field then being viewed to the alternate interlaced field. As will be subsequently made clear, this shift occurs in response to the switching sequence reversal of the multivibrator.

The operation of the non-random field shift apparatus of FIGURE 1 is as follows. Let it be assumed that the periodic train of vertical synchronizing pulses supplied by the pulse source 145 at its output terminal 140 is as represented in FIGURE 2(*a*). (For the sake of simplicity, all vertical serrations have been omitted.) This periodic train is then coupled along the conductor 135 to the input terminal 130 of the trigger generator 125. Each pulse of the train is converted to a trigger signal within generator 125 and, as a result, a periodic train of trigger signals is developed at its output terminal 120. Assuming that each trigger signal is initiated by the positive going edge of an input pulse, the periodic train of triggers developed will appear as the waveform shown in FIGURE 2(*b*). The first trigger is, as shown, numbered "1", the second "2," the third "3," etc.

Each of the triggers shown in the waveform of FIGURE 2(*b*) is coupled along the conductor 115 to the input terminal 110 of the multivibrator 100, and sequentially switches it from one of its stable states to its complementary stable state. Assuming the multivibrator to be in its "0" state initially and considering the action of the first five trigger signals coupled to it, it will be seen that trigger "1" switches the multivibrator to its "1" state, trigger "2" switches it to its "0" state, trigger "3" switches it to its "1" state, trigger "4" to its "0" state, and trigger "5" to its "1" state.

Assume that after trigger "5" has switched the multivibrator to its "1" state, but before trigger "6" is coupled to it, a manual pushbutton associated with the control trigger generator 165 is actuated. A control trigger is therefore supplied from its output terminal 160, along the conductor 155, to the control terminal 150 of the multivibrator 100. This trigger is assumed to be of such polarity as to switch the multivibrator from the stable state it is in at that time to its complementary stable state. Represented in FIGURE 2(*c*), this control trigger is effective to switch the multivibrator from its then "1" state to its complementary "0" state.

When trigger "6" is finally coupled to the multivibrator, instead of switching it to its "0" state, as it normally would have done, it switches it to its "1" state. Subsequent triggers "7," "8," "9," and "10" switch the multivibrator to its "0," "1," "0," and "1" states, respectively. Thus, whereas the odd-numbered triggers preceding the control trigger switched the multivibrator to its "1" state, the odd-numbered triggers following the control trigger switch the multivibrator to its "0" state. Similarly, whereas the even-numbered triggers preceding the control trigger switched the multivibrator to its "0" state, the even-numbered triggers following the control trigger switch the multivibrator to its "1" state.

This new switching sequence will continue until the manual pushbutton of the control trigger generator is actuated once again. A second control trigger is supplied at this later time, also from its output terminal 160, along the conductor 155, to the control terminal 150 of the multivibrator. Let it be assumed that this second control trigger is supplied to the multivibrator after trigger "10" has switched it to its "1" state but before trigger "11" is coupled to it. This second control trigger, represented in FIGURE 2(*d*), switches the multivibrator from its then "1" state to its complementary "0" state in the same manner as described above. When trigger "11" is finally coupled to the multivibrator, instead of its switching it to its "0" state, according to this new switching sequence, it switches it to its "1" state. Subsequent triggers "12," "13," "14," and "15" switch the multivibrator to its "0," "1," "0," and "1" states, respectively. The result is to once again reverse the sequence of switching operation—subsequently supplied odd-numbered pulses switch the multivibrator to its "1" state and subsequently supplied even-numbered pulses switch it to its "0" state.

The output pulse signal developed by multivibrator 100 at its output terminal 105 is represented by the waveform of FIGURE 2(*e*). This pulse signal is then coupled along the conductor 170 to the input terminal 175 of the trigger generator 180 wherein it is converted to a train of periodic trigger signals. This train, developed at the output terminal 185 and represented by the waveform of FIGURE 2(*f*), is then coupled along the conductor 190 to the input terminal 195 of the utilization device 200. The device 200 develops, in response to this trigger train, a series of sweep or sawtooth deflection waveforms for the oscilloscope of the waveform monitor in the usual way. It will be readily apparent from waveform (*f*) that the trigger generator 180 is so constructed as to be responsive only to the positive going edge of an input pulse.

Referring once again to the waveform of FIGURE 2(*a*), it will be understood that the leading edge of each vertical synchronizing pulse shown coincides in time with the start of one of the two interlaced fields of television picture information. The leading edges of the first, the third, the fifth, etc.—i.e., of the odd-numbered pulses—coincide with the start of the odd-line interlaced fields, for example, while the leading edges of the second, the fourth, the sixth, etc.—i.e., of the even-numbered pulses—coincide with the start of the even-line interlaced fields. As can be seen from waveform (*f*) in FIGURE 2, prior to the application of the first control trigger to the multivibrator 100, the generation of the deflection waveforms by the sweep circuits within the device 200 starts with the leading edges of the first vertical synchronizing pulse, the third vertical synchronizing pulse, and the fifth vertical synchronizing pulse. Prior to the application of the first control trigger, therefore, the time base system of the waveform monitor corresponds to the odd-line interlaced television field. With the application of the first control trigger (waveform (*c*)), however, the generation of the deflection waveforms starts with the leading edges of the sixth vertical synchronizing pulse, the eighth vertical synchronizing pulse, and the tenth synchronizing pulse.

Thus, the application of the first control trigger switches the time base system from that corresponding to the odd-line interlaced field to the even-line interlaced field. A similar analysis shows that the application of the second control trigger (waveform (*d*)) switches the time base system of the monitor back to its initial or odd-line field condition.

It is in the foregoing manner that the apparatus of FIGURE 1 provides a non-random field shift for the television waveform monitor. Every time the pushbutton, not shown, is actuated, the time base system is switched from one interlaced field to the alternate interlaced field. Every time the pushbutton is actuated, the oscilloscopic display is switched from the one vertical blanking interval to the alternate vertical blanking interval. A complete analysis of the horizontal synchronizing pulses, the vertical synchronizing pulses, and the equalizing pulses that occur during those intervals is, therefore, facilitated.

There is shown in FIGURE 3, a schematic diagram of a portion of the non-random field shift apparatus constructed according to the invention. The dotted box labelled 100 corresponds to the multivibrator of the same number in FIGURE 1 and the dotted box labelled 165 corresponds to the control trigger generator, also of like number. Positive input triggers supplied by trigger generator 125 are AC coupled via the .0015 $\mu f$ capacitor to the input terminal 110 and then, via one of the two 1N100 diodes, to the base of the "ON" 2N404 transistor. Whenever pushbutton switch S is closed, a negative trigger is coupled to the control terminal 150 and then, via one of the 330 ohm resistors to the emitter of the 2N404 transistor "ON" at that time. These negative triggers perform the same functions as the positive triggers shown in waveforms (*c*) and (*d*) in FIGURE 2. The output terminal 105 corresponds to the collector of the right-hand transistor.

Although FIGURE 3 shows the multivibrator 100 as being transistorized, it is not to be implied that the present invention is so limited. As will be obvious to those skilled in the art, the principles of the invention are applicable, whether the apparatus of FIGURE 1 employs transistors or vacuum tubes. It will be equally obvious that the polarities selected in FIGURE 2 and in FIGURE 3 are illustrative only and by no means limit the scope of the invention.

What is claimed is:

1. Non-random field shift apparatus for a television waveform monitor comprising:

a bistable multivibrator;

first means for supplying a periodic train of vertical synchronizing pulses to said multivibrator to effectuate switching thereof in a given sequence, the odd-numbered pulses of said train being time coincident with the start of one of the two interlaced fields of television picture information generated within a television camera and the even-numbered pulses of said train being time coincident with the start of the other of said interlaced fields;

second means for supplying a control trigger pulse to said multivibrator to reverse the switching sequence effectuated therein by said periodic train of synchronizing pulses;

and third means for coupling the output signal developed by said multivibrator to the sweep deflection circuits of the television waveform monitor to shift the time base system of the waveform monitor from that corresponding to one interlaced field to that corresponding to the other interlaced field in response to the switching sequence reversal of said multivibrator.

2. Non-random field shift apparatus for a television waveform monitor comprising:

a bistable multivibrator having two complementary stable states;

first means for supplying a periodic train of vertical synchronizing pulses to said multivibrator to effectuate switching thereof in a given sequence, the odd-numbered pulses of said train being time coincident with the start of one of the two interlaced fields of television picture information generated within a television camera and the even-numbered pulses of said train being time coincident with the start of the other of said interlaced fields;

said odd-numbered pulses being initially effective to switch said multivibrator to the first of said stable states and said even-numbered pulses being initially effective to switch said multivibrator to the second of said stable states;

second means for supplying a control trigger pulse to said multivibrator to switch the multivibrator from the stable state it is in at that time to its complementary stable state, to enable subsequently supplied even-numbered synchronizing pulses to switch said multivibrator to the first of said stable states and subsequently supplied odd-numbered synchronizing pulses to switch said multivibrator to the second of said stable states, and to thereby reverse the switching sequence effectuated in said multivibrator;

and third means for coupling the output signal developed by said multivibrator to the sweep deflection circuits of the television waveform monitor to shift the time base system of the waveform monitor from that corresponding to one interlaced field to that corresponding to the other interlaced field in response to the switching sequence reversal of said multivibrator.

3. Non-random field shift apparatus for a television waveform monitor comprising:

a bistable multivibrator having two complementary stable states represented by a "1" and a "0;"

first means for supplying a periodic train of vertical synchronizing pulses to said multivibrator to effectuate switching thereof in a given sequence, the odd-numbered pulses of said train being time coincident with the start of one of the two interlaced fields of television picture information generated within a television camera and the even-numbered pulses of said train being time coincident with the start of the other of said interlaced fields;

said odd-numbered pulses being initially effective to switch said multivibrator to its "1" state and said even-numbered pulses being initially effective to switch said multivibrator to its "0" state;

second means for supplying a control trigger pulse to said multivibrator to switch the multivibrator from the stable state it is in at that time to its complementary stable state, to enable subsequently supplied even-numbered synchronizing pulses to switch said multivibrator to its "1" state and subsequently supplied odd-numbered synchronizing pulses to switch said multivibrator to its "0" state, and to thereby reverse the switching sequence effectuated in said multivibrator;

and third means for coupling the output signal developed by said multivibrator to the sweep deflection circuits of the television waveform monitor to shift the time base system of the waveform monitor from that corresponding to one interlaced field to that corresponding to the other interlaced field in response to the switching sequence reversal of said multivibrator.

4. Non-random field shift apparatus for a television waveform monitor comprising:

a bistable multivibrator having two complementary stable states represented by a "1" and a "0";

first means for supplying a periodic train of vertical synchronizing pulses to said multivibrator to effectuate switching thereof in a given sequence, the odd-numbered pulses of said train being time coincident with the start of the odd-line interlaced fields of television picture information generated within a television camera and the even-numbered pulses of said train being time coincident with the start of the even-line interlaced fields;

said odd-numbered pulses being initially effective to switch said multivibrator to its "1" state and said even-numbered pulses being initially effective to switch said multivibrator to its "0" state;

second means for supplying a control trigger pulse to said multivibrator to switch the multivibrator from the stable state it is in at that time to its complementary stable state, to enable subsequently supplied even-numbered synchronizing pulses to switch said multivibrator to its "1" state and subsequently supplied odd-numbered synchronizing pulses to switch said multivibrator to its "0" state, and to thereby reverse the switching sequence effectuated in said multivibrator;

and third means for coupling the output signal developed by said multivibrator to the sweep deflection circuits of the television waveform monitor to shift the time base system of the waveform monitor from that corresponding to the odd-line interlaced fields to that corresponding to the even-line interlaced fields in response to the switching sequence reversal of said multivibrator.

5. Non-random field shift apparatus for a television waveform monitor comprising:

a bistable multivibrator;

first means for supplying a periodic train of vertical synchronizing pulses to said multivibrator to effectuate switching thereof in a given sequence, the odd-numbered pulses of said train being time coincident with the start of one of the two interlaced fields of television picture information generated within a television camera and the even-numbered pulses of said train being time coincident with the start of the other of said interlaced fields;

second means for supplying a control trigger pulse to said multivibrator at predetermined intervals, each of which enables synchronizing pulses supplied immediately thereafter to reverse the switching sequence effectuated in said multivibrator by synchronizing pulses supplied immediately therebefore;

and third means for coupling the output signal developed by said multivibrator to the sweep deflection circuits of the television waveform monitor to alternatively shift the time base system of the waveform monitor from that corresponding to one interlaced field to that corresponding to the other interlaced field in response to each switching sequence reversal of said multivibrator.

6. Non-random field shift apparatus for a television waveform monitor comprising:

a bistable multivibrator;

means for supplying a periodic train of vertical synchronizing pulses, the leading edges of the odd-numbered pulses thereof being time coincident with the start of the odd-line interlaced fields of television picture information generated within a television camera and the leading edges of the even-numbered pulses being time coincident with the start of the even-line interlaced fields;

means for converting said periodic train of synchronizing pulses to a periodic train of input trigger pulses of identical time relationships with respect to said interlaced fields and for applying said latter train to an input terminal of the multivibrator to effectuate switching thereof in a given sequence;

means for supplying a control trigger pulse to a control terminal of said multivibrator at predetermined intervals, each of which enables synchronizing pulses supplied immediately thereafter to reverse the switching sequence effectuated in said multivibrator by synchronizing pulses supplied immediately therebefore;

and means for converting the output pulse signal developed by said multivibrator to a train of output trigger pulses and for coupling said output train to the sweep deflection circuits of the television waveform monitor to alternatively shift the time base system of the waveform monitor from that corresponding to the odd-line interlaced fields to that corresponding to the even-line interlaced fields in response to each shifting sequence reversal of said multivibrator.

7. Apparatus according to claim 6 in which said second means is manually actuated by supply said control trigger pulses.

8. Non-random field shift apparatus for a television waveform monitor comprising:

a bistable multivibrator having an input terminal, a control terminal, and an output terminal;

an input trigger generator having an output terminal electrically connected to the input terminal of said multivibrator;

means for supplying a periodic train of vertical synchronnizing pulses to an input terminal of said input trigger generator for conversion to a first periodic train of trigger pulses;

a control trigger generator having an output terminal electrically connected to the control terminal of said multivibrator;

manually actuated means included within said control trigger generator for causing said control trigger generator to supply a control pulse at predetermined intervals to said multivibrator;

an output trigger generator having an input terminal electrically connected to the output terminal of said multivibrator for converting the pulse signal developed thereat by said multivibrator to a second train of trigger pulses;

and means for coupling said second train of trigger pulses to the deflection circuits of the television waveform monitor for shifting the time base system thereof.

References Cited

UNITED STATES PATENTS

| | | | |
|---|---|---|---|
| 2,595,646 | 5/1952 | Doba | 178—6 |
| 2,615,979 | 10/1952 | Abbenhouse | 178—7.5 |
| 3,072,739 | 1/1963 | Germany | 178—6 |

ROBERT L. GRIFFIN, *Primary Examiner.*

J. A. ORSINO, *Assistant Examiner.*

U.S. Cl. X.R.

178—7.5; 324—88; 328—187